July 20, 1965   J. E. JONES ETAL   3,196,373
SATURABLE REACTORS
Filed Nov. 29, 1962                            2 Sheets-Sheet 1
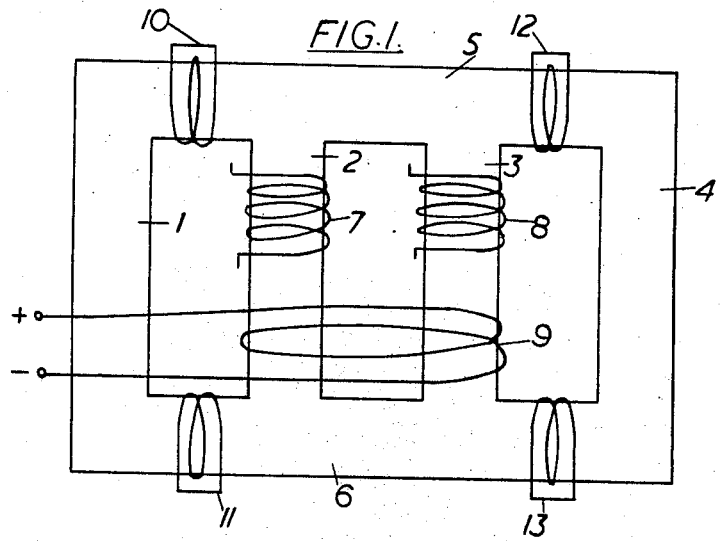
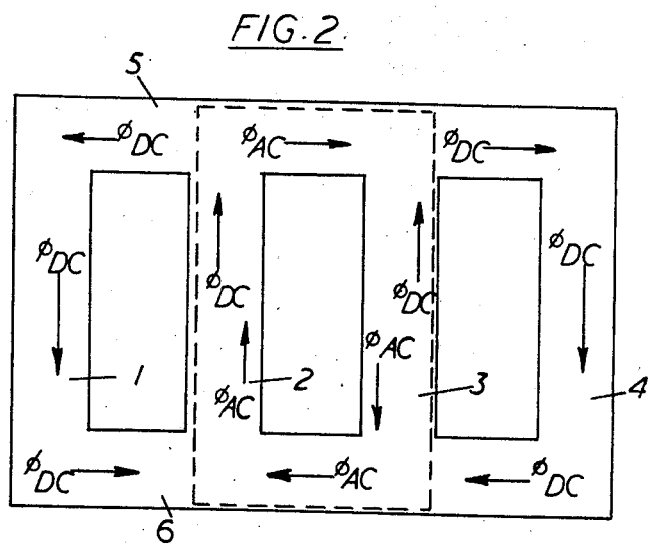
Inventors
J. E. JONES
M. A. SPURWAY
By
Cameron, Kerkam & Sutton
Attorneys Inventors
J. E. JONES
M. A. SPURWAY United States Patent Office 3,196,373
Patented July 20, 1965

3,196,373
SATURABLE REACTORS
John Ernest Jones, Macclesfield, Cheshire, and Maurice Alec Spurway, Manchester, Lancashire, England, assignors to Ferranti, Limited, Hollinwood, Lancashire, England, a company of Great Britain and Northern Ireland
Filed Nov. 29, 1962, Ser. No. 240,794
Claims priority, application Great Britain, Dec. 5, 1961, 43,401/61
4 Claims. (Cl. 336—73)

This invention relates to polyphase saturable reactors.

In polyphase saturable reactors including a core having one or more legs for each phase and two yokes joining the legs the direct current flux in the yokes is not constant throughout the length of the yokes. If the yokes are provided with portions of increased cross-sectional area to provide a direct current flux path which is such that the direct current flux density within the yokes is substantially constant the alternating current flux is also able to flow in the portions of increased cross-sectional area. In previously known saturable reactors, therefore, the yokes have been made of a cross-sectional area which is large compared to that of the legs such that saturation does not occur in the yokes. This, however requires large yokes which, since they do not saturate, do not contribute to the control action of the saturable reactor.

It is an object of the present invention to provide a saturable reactor in which part of each yoke is included in the magnetic circuit.

According to the present invention a polyphase saturable reactor includes a core having yokes provided with portions which form paths for direct current flux only, alternating current flux being excluded from said portions by means of short circuited windings wound around said portions and fixed with respect thereto.

Said core may include one leg for each phase and two further legs forming a return path for the direct current flux, said two further legs being the outer legs of said core, all of said legs being joined by yokes, alternating current flux being excluded from the portions of the yoke between the outer legs and the legs adjacent the outer legs by means of short circuited windings wound around said portions and fixed with respect thereto.

Alternatively said core may include two legs for each phase, the direct current winding of said saturable reactor being such that in operation direct current flux is in one direction in one leg of each phase and in the opposite direction in the other leg of each phase, said legs being joined by yokes having additional portions which increase the cross-sectional area of said yokes to provide a direct current flux path which is such that the direct current flux density within said yokes is substantially constant, alternating current flux being excluded from said additional portions by means of short circuited windings wound around said additional portions and fixed with respect thereto.

The present invention will now be described by way of example with reference to the accompanying drawings in which:

FIGURE 1 is a schematic drawing showing the windings and core of a two phase saturable reactor in accordance with the invention, FIGURE 2 is a schematic drawing showing the flux distribution in the core of the saturable reactor shown in FIGURE 1.

Figure 3:
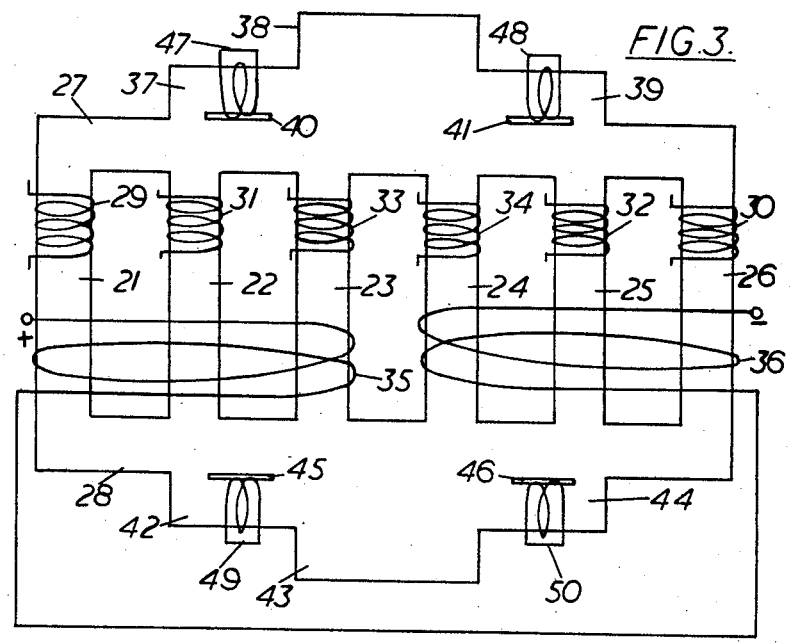
FIGURE 3 is a schematic drawing showing the windings and core of a three phase saturable reactor in accordance with the invention.

Referring now to FIGURES 1 and 2 of the drawings, there is shown schematically a two phase saturable reactor including a core having four legs 1, 2, 3 and 4 joined by two yokes 5 and 6 of uniform cross-sectional area. The saturable reactor has one winding for each phase of the alternating current (A.C.), one winding 7 being mounted on the leg 2 and the other winding 8 being mounted on the leg 3. A direct current (D.C.) winding 9 is wound around both of the legs 2 and 3. Short circuited windings 10, 11, 12 and 13 are wound around the parts of the yokes 5 and 6 between the legs 1 and 2 and between the legs 3 and 4 respectively.

In operation the currents induced in the short circuited windings 10, 11, 12 and 13 effectively exclude A.C. flux from the parts of the yokes 5 and 6 between the legs 1 and 2 and between the legs 3 and 4, and the A.C. flux is therefore limited to the path enclosed by the broken line in FIGURE 2. The short circuited windings 10, 11, 12 and 13, however, do not inhibit the D.C. flux and the outer legs 1 and 4 of the core act as a return path for the D.C. flux. The flux distribution at a particular instant is shown in FIGURE 2 in which $\phi_{A.C.}$ represents the A.C. flux and $\phi_{D.C.}$ represents the D.C. flux.

In this manner the parts of the yokes 5 and 6 between the legs 2 and 3 are added to the saturable magnetic circuit and increase the effective saturable leg length of the core. The A.C. current that is required to flow in the windings 7 and 8 to cause saturation of the core is therefore increased thus effectively increasing the rating of the saturable reactor.

Figure 4:
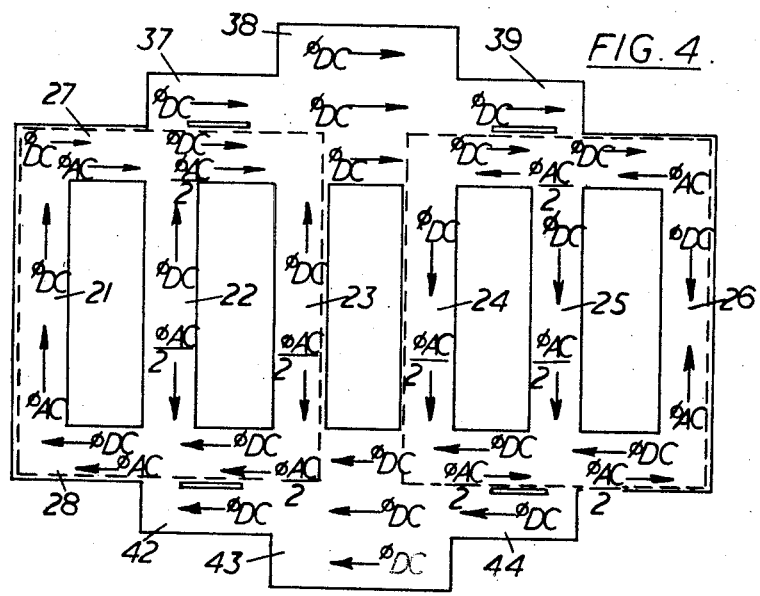
FIGURE 4 is a schematic drawing showing the flux distribution in the core of the saturable reactor shown in FIGURE 3.

Referring now to FIGURES 3 and 4 of the drawings there is shown schematically a three phase transductor saturable reactor suitable for shunt connection and including a core having six legs 21, 22, 23, 24, 25 and 26 joined by two yokes 27 and 28. The saturable reactor has two windings connected in parallel for each phase, the windings 29 and 30 for the first phase being mounted on the outer legs 21 and 26, the windings 31 and 32 for the second phase being mounted on the legs 22 and 25 and the windings 33 and 34 for the third phase being mounted on the legs 23 and 24. The D.C. winding has two halves connected in series opposition, one half 35 surrounding the legs 21, 22 and 23 and the other half 36 surrounding the legs 24, 25 and 26.

The yoke 27 is provided with additional portions 37, 38 and 39 which increase the cross-sectional area of the yoke which is also provided with slots 40 and 41 which extend through the yoke and extend along part of the length of the portions 37 and 39 in such a position that the cross-sectional area of the yoke between the slots and the legs is substantially the same as the cross-sectional area of the end portions of the yoke. Similarly, the yoke 28 is provided with additional portions 42, 43 and 44 which increase the cross-sectional area of the yoke which is also provided with slots 45 and 46 which extend through the yokes and extend along part of the length of the portions 42 and 44 in such a position that the cross-sectional area of the yoke between the slots and the legs is substantially the same as the cross-sectional area of the end portions of the yoke. Short circuited windings 47, 48, 49 and 50 are wound around the additional portions 37, 39, 42 and 44 of the yokes 27 and 28 respectively.

In operation the D.C. winding establishes a flux of $\phi_{D.C.}$ upwards in each of the legs 21, 22 and 23 and downwards in each of the legs 24, 25 and 26 as is shown in FIGURE 4. The D.C. flux in the yokes 27 and 28 therefore varies along their lengths from $\phi_{D.C.}$ between the legs 21 and 22 and between the legs 25 and 26, to $2\phi_{D.C.}$ between the legs 22 and 23 and between the legs 24 and 25 to $3\phi_{D.C.}$ between the legs 23 and 24, and the cross-sectional area of the portions 37, 38, 39, 42, 43 and 44 is made such that the D.C. flux density in the yokes 27 and 28 is constant along their length. Due to the current flowing in the short circuited windings 47, 48, 49 and 50, A.C. flux is effectively excluded from the portions 37, 39, 42 and 44 and the A.C. flux is limited to the paths enclosed by the broken line in FIGURE 4, no A.C. flux entering the portions of the yokes between the legs 23 and 24. The A.C. flux at one particular instant is shown in FIGURE 4 and it will be seen that in leg 21 there is an A.C. flux $\phi_{A.C.}$ in the same direction as the D.C. flux $\phi_{D.C.}$, there being a similar flux distribution in the portions of the yokes 27 and 28 between the legs 21 and 22. Due to the shunt connections the A.C. flux divides equally between the legs 22 and 23 in which it is in the opposite direction to the D.C. flux, and in the portions of the yokes between the legs 22 and 23 from which A.C. flux is not excluded by the windings 47 and 49 there is therefore an A.C. flux of $\frac{1}{2}\phi_{A.C.}$ in the same direction as the D.C. flux of $\phi_{D.C.}$. In the leg 26 there is an A.C. flux $\phi_{A.C.}$ which is in opposition to the D.C. flux $\phi_{D.C.}$ and which therefore does not contribute to the ampere-turn requirements of this phase at this particular instant. Half a cycle later, however, these conditions are reversed and there is an A.C. flux $\phi_{A.C.}$ in the leg 21 which is in the opposite direction to the D.C. flux $\phi_{C.D.}$, and there is an A.C. flux $\phi_{A.C.}$ in the leg 26 which is in the same direction as the D.C. flux $\phi_{D.C.}$, there being a similar flux distribution in the portions of the yokes 27 and 28 between the legs 25 and 26 and an A.C. flux of $\frac{1}{2}\phi_{A.C.}$ in the same direction as the D.C. flux of $\phi_{D.C.}$ in the portions of the yokes between the legs 24 and 25 from which A.C. flux is not excluded by the windings 48 and 50. The leg length of the core is thus effectively increased.

Similarly, when there is an A.C. flux of $\phi_{A.C.}$ upwards in the leg 22 there is a flux of $\frac{1}{2}\phi_{A.C.}$ in the same direction as the D.C. flux $\phi_{D.C.}$ in the portion of the yokes between the legs 22 and 23 from which A.C. flux is not excluded, and at the same instant there is also an A.C. flux of $\frac{1}{2}\phi_{A.C.}$ in the same direction as the D.C. flux of $\phi_{D.C.}$ in the portions of the yokes between the legs 25 and 26 since the A.C. flux of $\phi_{A.C.}$ is upwards in the leg 25. The effective increase in leg length for this phase is therefore approximately equal to the effective increase in leg length for the other phases to give an approximate balance between all three phases. If an exact balance is required the number of A.C. ampere-turns provided on the legs 22 and 25 may be varied slightly from those on the remaining legs. A further adjustment may be made by varying the positions of the slots 40, 41, 45 and 46 thereby varying the amount of iron enclosed by the short circuited windings 47, 48, 49 and 50. As in the previous example, the current that is required to flow in the windings to cause saturation of the core is increased thus effectively increasing the rating of the saturable reactor.

What we claim is:

1. A polyphase saturable reactor including a core having a plurality of inner legs and outer legs, a first and second yoke joining opposite ends of said legs, an alternating current winding mounted on each of said inner legs, a direct current winding wound about said inner legs for establishing a direct current flux in each leg of said core, each of said yokes having a first portion of constant cross-section intermediate said inner legs providing a path for both alternating current flux and direct current flux and additional portions adjacent opposite ends of said first portion providing paths for direct current flux only, and a short circuited winding wound around each of said additional portions and fixed with respect thereto to exclude alternating current flux therefrom.

2. A polyphase saturable reactor as claimed in claim 1 in which said core includes one leg for each phase and two further legs providing a return path for the direct current flux, said two further legs being the outer legs of said core, said additional portions of each of said yokes joining the outer legs to the inner legs.

3. A polyphase saturable reactor including a core having a first and a second leg for each phase, an alternating current winding for each phase, each alternating current winding including two sections, one of said two sections of any one phase being mounted on said first leg of that phase, the other of said two sections being mounted on said second leg of that phase, a direct current winding including two halves connected in series opposition, one half of said direct current winding being wound about said first legs and the other half of said direct current winding being wound around said second legs for establishing a direct current flux in one direction in said first leg of each phase and in the opposite direction in said second leg of each phase, a first and a second yoke, each of said yokes having a first portion of constant cross section joining opposite ends of said legs and an additional portion adjacent said first portion, said first portion of constant cross section providing a path for both alternating current flux and direct current flux, said additional portion providing an increased cross-sectional area for said yoke and a path for direct current flux only such that the direct current flux density within said yokes is substantially constant along the length of said yokes, and a short circuited winding wound around each additional portion and fixed with respect thereto to exclude alternating current flux therefrom.

4. A polyphase saturable reactor including a core having a first and a second leg for each phase, an alternating current winding for each phase, each alternating current winding including two sections, one of said two sections of any one phase being mounted on said first leg of that phase, the other of said two sections being mounted on said second leg of that phase, a direct current winding including two halves connected in series opposition, one half of said direct current winding being wound about said first legs and the other half of said direct current winding being wound about said second legs for establishing a direct current flux in one direction in said first leg of each phase and in the opposite direction in said second leg of each phase, a first and a second yoke, each of said yokes having a first portion of constant cross section joining opposite ends of said legs and an additional portion adjacent said first portion, said first portion of constant cross section providing a path for both alternating current flux and direct current flux, said additional portion providing an increased cross-sectional area for said yoke and a path for direct current only such that the direct current flux density within said yokes is substantially constant along the length of said yokes, a short circuited winding wound around each additional portion and fixed with respect thereto to exclude alternating current flux therefrom, each of said yokes having slots which pass through said yokes and which extend along part of the length of said additional portion, said slots being positioned such that the cross-sectional area of said yokes between said slots and said legs is substantially the same as the cross-sectional area of the end portions of said yokes, said short circuited windings passing through said slots.

References Cited by the Examiner

UNITED STATES PATENTS

| | | | |
|---|---|---|---|
| 1,614,161 | 1/27 | Stahl | 336—160 X |
| 2,212,543 | 8/40 | Jovy | 336—12 |
| 2,595,753 | 5/52 | Beardsley | 336—12 X |
| 2,779,926 | 1/57 | Johnson et al. | 336—5 |

JOHN F. BURNS, *Primary Examiner.*

LARAMIE E. ASKIN, *Examiner.*